US012421402B2

(12) United States Patent
Miller

(10) Patent No.: US 12,421,402 B2
(45) Date of Patent: Sep. 23, 2025

(54) COATING COMPOSITIONS CONTAINING LOW MOLECULAR WEIGHT CHITOSAN COMPOSITION

(71) Applicant: SWIMC LLC, Cleveland, OH (US)

(72) Inventor: Cory G. Miller, Cleveland, OH (US)

(73) Assignee: SWIMC LLC, Cleveland, OH (US)

( * ) Notice: Subject to any disclaimer, the term of this patent is extended or adjusted under 35 U.S.C. 154(b) by 120 days.

(21) Appl. No.: 18/066,573

(22) Filed: Dec. 15, 2022

(65) Prior Publication Data

US 2023/0193059 A1 Jun. 22, 2023

Related U.S. Application Data

(63) Continuation of application No. 17/682,240, filed on Feb. 28, 2022, now Pat. No. 11,560,487, which is a
(Continued)

(51) Int. Cl.

| C09D 7/61 | (2018.01) |
|---|---|
| C08K 3/22 | (2006.01) |
| C08L 5/08 | (2006.01) |
| C09D 5/02 | (2006.01) |
| C09D 7/20 | (2018.01) |

(Continued)

(52) U.S. Cl.
CPC ............... *C09D 7/65* (2018.01); *C08K 3/22* (2013.01); *C08L 5/08* (2013.01); *C09D 5/022* (2013.01); *C09D 5/025* (2013.01); *C09D 5/028* (2013.01); *C09D 7/20* (2018.01); *C09D 7/61* (2018.01); *C09D 7/69* (2018.01); *C09D 7/80* (2018.01); *C09D 105/08* (2013.01); *C09D 133/04* (2013.01); *C08K 2003/2241* (2013.01)

(58) Field of Classification Search
CPC ............ C09D 7/65; C09D 105/08; C08L 5/08
See application file for complete search history.

(56) References Cited

U.S. PATENT DOCUMENTS 5,691,014 A * 11/1997 Andersen .............. B29C 67/243
428/35.8
6,132,750 A 10/2000 Perrier et al.
(Continued)

FOREIGN PATENT DOCUMENTS

| CN | 1139116 A | 1/1997 |
|---|---|---|
| CN | 1712431 A | 12/2005 |

(Continued)

OTHER PUBLICATIONS

Machine translation of DE4303415A1, publication date Aug. 11, 1994.*
(Continued)

*Primary Examiner* — Jun Li

(57) ABSTRACT

Paint and coating compositions including a low molecular weight chitosan that may be incorporated in a coating composition at higher loading levels, which exhibits one or more of improved elongation, improved thermocycling characteristics, reduced leaching of coating components, are lesser susceptibility to fungal and mildew defacement than conventional coatings or coatings containing higher molecular weight chitosan compounds, articles coated in the same, and methods for making said coatings and coated articles.

16 Claims, 10 Drawing Sheets

Related U.S. Application Data continuation-in-part of application No. PCT/US2021/051013, filed on Sep. 20, 2021.

(60) Provisional application No. 62/706,973, filed on Sep. 22, 2020.

(51) Int. Cl.
| | | |
|---|---|---|
| *C09D 7/40* | (2018.01) | |
| *C09D 7/65* | (2018.01) | |
| *C09D 7/80* | (2018.01) | |
| *C09D 105/08* | (2006.01) | |
| *C09D 133/04* | (2006.01) | |

(56) References Cited

U.S. PATENT DOCUMENTS

| | | | |
|---|---|---|---|
| 7,541,017 | B2 | 6/2009 | Bringley et al. |
| 7,807,194 | B2 | 10/2010 | Modliszewski et al. |
| 8,008,439 | B2 | 8/2011 | Tsukada et al. |
| 8,287,952 | B2 | 10/2012 | Bringley et al. |
| 9,023,333 | B2 | 5/2015 | Frahling et al. |
| 9,044,410 | B2 | 6/2015 | Domard et al. |
| 9,556,523 | B2 | 1/2017 | Wasserfallen et al. |
| 10,280,513 | B2 | 5/2019 | Wasserfallen et al. |
| 10,377,878 | B2 | 8/2019 | Li et al. |
| 2005/0014851 | A1 | 1/2005 | Bringley |
| 2007/0272119 | A1 * | 11/2007 | Ichinose ............... C09D 5/165 106/18.32 |
| 2010/0016443 | A1 | 1/2010 | Toledano et al. |
| 2011/0009268 | A1 | 1/2011 | Uhr et al. |
| 2013/0145957 | A1 | 6/2013 | Shchukin et al. |
| 2013/0165525 | A1 | 6/2013 | Scheuing et al. |
| 2015/0179357 | A1 | 6/2015 | Ichinomiya et al. |
| 2015/0322288 | A1 | 11/2015 | Wasserfallen et al. |
| 2016/0296665 | A1 | 10/2016 | Ingber et al. |
| 2016/0376535 | A1 | 12/2016 | Chieffi et al. |
| 2017/0066009 | A1 | 3/2017 | Bremser et al. |
| 2017/0081542 | A1 | 3/2017 | Bremser et al. |
| 2017/0189928 | A1 | 7/2017 | Scharrenbach |
| 2017/0369640 | A1 | 12/2017 | Burgo et al. |
| 2018/0207912 | A1 | 7/2018 | Li et al. |
| 2019/0000745 | A1 | 1/2019 | Chiattello et al. |
| 2019/0048207 | A1 | 2/2019 | Wasserfallen et al. |
| 2019/0155975 | A9 | 5/2019 | Cetti et al. |
| 2020/0255631 | A1 | 8/2020 | Prinyawiwatkul et al. |
| 2020/0276057 | A1 | 9/2020 | Salmon et al. |
| 2021/0108162 | A1 | 4/2021 | Scheuing et al. |

FOREIGN PATENT DOCUMENTS

| | | | | |
|---|---|---|---|---|
| CN | 101190976 | | 6/2008 | |
| CN | 100448921 | | 1/2009 | |
| CN | 101347127 | | 1/2009 | |
| CN | 101314631 | | 5/2011 | |
| CN | 101864051 | | 10/2011 | |
| CN | 101314650 | | 1/2012 | |
| CN | 102417778 | | 4/2012 | |
| CN | 101717529 | | 6/2012 | |
| CN | 102816493 | | 12/2012 | |
| CN | 103058945 | | 4/2013 | |
| CN | 102492335 | | 6/2013 | |
| CN | 103628306 | | 3/2014 | |
| CN | 103756481 | | 4/2014 | |
| CN | 102775647 | | 7/2014 | |
| CN | 103408946 | | 7/2014 | |
| CN | 103194134 | | 1/2015 | |
| CN | 103146264 | | 2/2015 | |
| CN | 104530843 | | 4/2015 | |
| CN | 104628888 | | 5/2015 | |
| CN | 103232619 | | 6/2015 | |
| CN | 104774244 | | 7/2015 | |
| CN | 104830074 | | 8/2015 | |
| CN | 104927491 | | 9/2015 | |
| CN | 105017913 | | 11/2015 | |
| CN | 103467623 | | 12/2015 | |
| CN | 105462496 | | 4/2016 | |
| CN | 105544302 | | 5/2016 | |
| CN | 105567037 | | 5/2016 | |
| CN | 105801890 | | 7/2016 | |
| CN | 106010050 | | 10/2016 | |
| CN | 106221502 | | 12/2016 | |
| CN | 106336741 | | 1/2017 | |
| CN | 106381017 | | 2/2017 | |
| CN | 106497291 | | 3/2017 | |
| CN | 106832439 | | 3/2017 | |
| CN | 106691029 | | 5/2017 | |
| CN | 106820812 | | 6/2017 | |
| CN | 106867344 | | 6/2017 | |
| CN | 107509808 | | 7/2017 | |
| CN | 107119491 | | 9/2017 | |
| CN | 107141370 | | 9/2017 | |
| CN | 107254270 | | 10/2017 | |
| CN | 107312285 | | 11/2017 | |
| CN | 107353716 | | 11/2017 | |
| CN | 107384133 | | 11/2017 | |
| CN | 107474611 | | 12/2017 | |
| CN | 107502071 | | 12/2017 | |
| CN | 107739556 | | 2/2018 | |
| CN | 107936766 | | 4/2018 | |
| CN | 107981475 | | 5/2018 | |
| CN | 108102489 | | 6/2018 | |
| CN | 108102544 | | 6/2018 | |
| CN | 108192122 | | 6/2018 | |
| CN | 108192154 | | 6/2018 | |
| CN | 108219212 | | 6/2018 | |
| CN | 106987234 | | 7/2018 | |
| CN | 108250475 | | 7/2018 | |
| CN | 108310471 | | 7/2018 | |
| CN | 108329788 | | 7/2018 | |
| CN | 108342132 | | 7/2018 | |
| CN | 107793855 | | 8/2018 | |
| CN | 108384064 | | 8/2018 | |
| CN | 108478494 | | 9/2018 | |
| CN | 108530667 | | 9/2018 | |
| CN | 108586828 | | 9/2018 | |
| CN | 105002780 | | 10/2018 | |
| CN | 108610539 | | 10/2018 | |
| CN | 108624049 | | 10/2018 | |
| CN | 108753030 | | 11/2018 | |
| CN | 108892810 | | 11/2018 | |
| CN | 109054105 | | 12/2018 | |
| CN | 109054621 | | 12/2018 | |
| CN | 109082165 | | 12/2018 | |
| CN | 109135449 | | 1/2019 | |
| CN | 109206951 | | 1/2019 | |
| CN | 109206986 | | 1/2019 | |
| CN | 109232943 | | 1/2019 | |
| CN | 109233730 | | 1/2019 | |
| CN | 109294001 | | 2/2019 | |
| CN | 109354955 | | 2/2019 | |
| CN | 109370351 | | 2/2019 | |
| CN | 109810526 | | 5/2019 | |
| CN | 109825145 | | 5/2019 | |
| CN | 109942208 | | 6/2019 | |
| CN | 110028863 | | 7/2019 | |
| CN | 110105531 | | 8/2019 | |
| CN | 113230450 A * | | 8/2021 | |
| DE | 4303415 A1 * | | 8/1994 | ............... A01N 3/04 |
| EP | 1919981 | | 5/2008 | |
| EP | 3170394 A1 | | 5/2017 | |
| EP | 3247756 | | 11/2017 | |
| EP | 3922689 | | 12/2021 | |
| IN | 105949900 | | 9/2016 | |
| JP | 2001342435 | | 12/2001 | |
| JP | 2003174169 | | 6/2003 | |
| JP | 2003306646 | | 10/2003 | |
| JP | 2007169610 | | 7/2007 | |
| JP | 2007320977 | | 12/2007 | |
| JP | 2007320977 A | | 12/2007 | |
| KR | 101765374 | | 8/2017 | |
| KR | 101889286 | | 8/2018 | |

(56) References Cited

FOREIGN PATENT DOCUMENTS

| TW | I257346 | 7/2006 | | |
|---|---|---|---|---|
| WO | 200509603 | 2/2005 | | |
| WO | WO-2020234643 A1 * | 11/2020 | ............. | A01N 43/16 |

OTHER PUBLICATIONS

International Search Report & Written Opinion for PCT/US2021/051013 dated Dec. 21, 2021, 7 pages.
Eikenes, et al. "Chitosan for wood protection—state of the art" The International Research Group On Wood Protection, 36th Annual Meeting, Bangalore, India, Apr. 24-28, 2005.
Piegat, et al. "The Importance of Reaction Conditions on the Chemical Structure of N,O-Acylated Chitosan Derivatives", Molecules 2019, 24, 3047; doi:10.3390/molecules24173047, 16 pages.
Proquip, Inc., "Viscosity Conversion Chart" www.proquipinc.com/viscosity_conversion_chart, 2010.

\* cited by examiner

COATING COMPOSITIONS CONTAINING LOW MOLECULAR WEIGHT CHITOSAN COMPOSITION

CROSS REFERENCE TO RELATED APPLICATION

This application is a continuation of U.S. Non-Provisional application Ser. No. 17/682,240 filed on Feb. 28, 2022, which itself is a continuation-in-part under 35 U.S.C. § 120 of international patent application number PCT/US2021/051013, filed on Sep. 20, 2021, which claims priority under 35 U.S.C. § 119 to U.S. provisional patent application No. 62/706,973, filed on Sep. 22, 2020.

FIELD OF THE INVENTION

This invention relates to paints and coatings containing chitosan that provide useful benefits over conventional coatings in the form of improved resistance to leaching, improved elongation and lesser susceptibility to fungal or mildew defacement than conventional coatings, articles coated in the same, and methods for making said coatings or coated articles.

BACKGROUND

Paints and coatings typically contain three essential ingredients: carrier liquid, binder, and additives. Pigment is also commonly added in many paints and coatings. Each of such ingredients may comprise a single component or several different items mixed into the paint or coating.

The carrier liquid is a fluid component of the paint which serves to carry all of the other paint components. The carrier liquid is part of the wet paint and usually evaporates as the paint forms a film and dries on a surface. In latex paints, the carrier liquid is usually water. In oil-based paints, the carrier liquid is usually an organic solvent. The amount and type of liquid is usually determined by features of the other paint components.

The binder component of a paint or coating is what causes the paint or coating to form a film on and adhere to a surface. In a latex paint, the binder comprises a latex resin, usually selected from acrylics, vinyl acrylics, styrene acrylics, or polyurethane dispersions ("PUDs"). In a latex paint or coating, the latex resin particles usually are in a dispersion with water as the carrier liquid.

Pigments provide the paint or coating with both decorative and protective features. Pigments are solid particles used to provide the paint or coating with various qualities, including but not limited to color, opacity, and durability. The paint or coating may also contain other solid particles such as polyurethane beads or other solids. Pigments and other solids add bulk to the paint or coating and their levels are related to the gloss or flatness of the paint or coating. Pigments may also impart color to a paint or coating.

A multitude of additives may be included in paints and coatings. The additives are typically used at relatively low levels in the paint/coating formulation, but contribute to various properties of paints and coatings, including rheology, stability, paint performance, in-can preservation, dry film preservation or protection, and application quality.

Biocides are additives that have antimildew, bacteriostatic and bactericidal properties. A variety of biocidal agents are well known and are used for various purposes including but not limited to preservation of wet paint or coatings ("in-can" preservation) and preservation or protection of dry films on coated articles. Such biocides include inorganic biocidal agents, for example, those containing metal ions, such as silver, zinc, and copper. Other inorganic biocides include phosphates, metal ion, metal or other biocide containing zeolites or hydroxyapatites. There are also organic biocides including organic acids, phenols, alcohols, and quaternary ammonium compounds.

Some biocides act specifically, such as mildewcidal or fungicidal agents, which are additives that have mildewcidal or fungicidal properties. Mildewcidal and fungicidal agents work to prevent, reduce, or forestall the formation of mildew in cured paint or coating films. Zinc compounds, including zinc oxide, are common fungicides and mildewcides, the use of which is effective at mildew, mold, and fungus prevention and/or reduction in cured films. Zinc oxide can have drawbacks and create issues in dispersibility of paints and coatings. Other known fungicides include iodopropynyl butyl-carbamate (IPBC), 2-octyl-3 (2H)-isothiazolone (OIT), chlorothalonil, and the like.

Chitosan is a bio-based material that may be obtained in a renewable fashion from chitin coming from crustaceans, among other sources, and, if dispersible, would be a useful additive or filler in paint formulations. In conventional practice, despite its relatively low cost and relative renewability, chitosan is not used in paints and coatings due to its water insolubility, a negative effect on the quality of the paint and coatings, and the difficulty in adequately dispersing chitosan in latex and other waterborne, dispersion systems for paints and coatings. Providing a consistently dispersed paint or coating is important for ease of manufacturability but also for providing a high-quality paint without grit or other defects in consistency, application, appearance, or feel.

The relevant art has pursued alternative approaches in attempts at solubilizing or dispersing chitosan in water. One such approach involves providing chitosan in acidic solution. Acidic solutions are highly impractical for direct addition to waterborne paints and coatings, which are overwhelmingly basic in pH. Adding a significantly acidic solution to maintain acidity and thus maintain the chitosan in solution would greatly disturb the stability of a coating formulation and would require drastic reformulation. Other approaches require cost-prohibitive chemical modification to the chitosan polymer backbone with hydrophilic groups prior to addition to waterborne paints or coatings to provide water solubility.

BRIEF DESCRIPTION OF THE DRAWINGS

FIG. 3A shows a Hardie Board painted with Positive Control Paint 1; FIG. 3B shows a Hardie board painted with Negative Control Paint; FIG. 3C shows a Hardie board painted with Example Paint 1; FIG. 3D shows a Hardie Board painted with Example Paint 2; and FIG. 3E shows a Hardie board painted with Example Paint 3.

FIG. 4A shows aluminum panel painted with Positive Control Paint 1; FIG. 4B shows aluminum panel painted with Negative Control Paint; FIG. 4C shows aluminum panel painted with Example Paint 1; FIG. 4D shows aluminum panel painted with Example Paint 2; and FIG. 3E shows aluminum panel painted with Example Paint 3.

FIG. 5A shows Positive Control Paint 1. FIG. 5B shows Negative Control Paint, and FIG. 5C shows Example Paint 1.

FIG. 7A shows aluminum panel painted with Positive Control Paint 1; FIG. 7B shows aluminum panel painted with Negative Control Paint; FIG. 7C shows aluminum panel painted with Modified Example Paint 4.

SUMMARY OF THE INVENTION

Figure 1A:
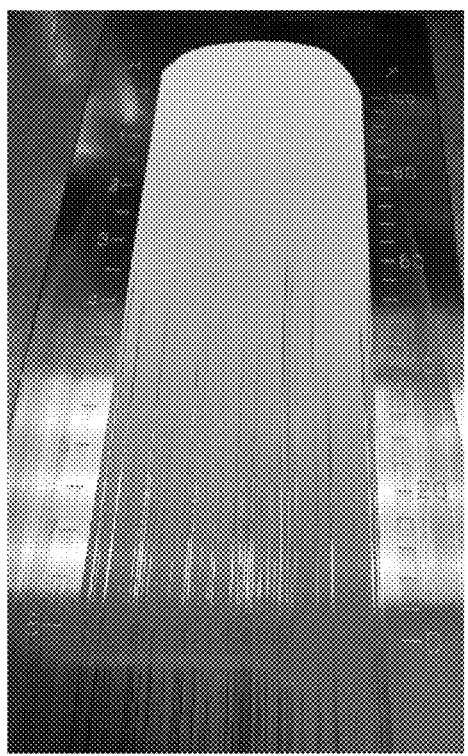
FIG. 1A shows a Hegman gauge drawdown of Positive Control Paint 1.

The present invention comprises, in one embodiment, a paint or coating composition comprising water, latex binder resin, and additives, wherein such additives include, but are not limited to, a chitosan composition that includes a low molecular weight chitosan compound. In some embodiments, the chitosan compound has a number average molecular weight (Mn) of at most 40,000.

In some embodiments, the chitosan compound additive has a particle size of less than 30 microns in the paint or coating, determined using ASTM D1210-05 "Standard Test Method for Fineness of Dispersion of Pigment-Vehicle Systems by Hegman-Type Gage". In another embodiment, the invention comprises a coated article formed from a paint or coating composition comprising water, latex binder resin, and additives, wherein such additives include but are not limited to, a chitosan compound and wherein the paint or coating composition dries to form a film on the coated article. The chitosan compound is distributed throughout the film on the coated article. In some embodiments, the chitosan compound additive has as particle size less than 30 microns when dispersed in a paint or coating, determined using ASTM D1210-05. Hegman gauge values below 30 microns are also indicative of adequate dispersibility of the chitosan. The dried paint or coating film displays improved elongation as measured according to ASTM D2370-16 "Standard Test Method for Tensile Properties", improved thermocycling characteristics using the rating scales according to ASTM D714-02 "Standard Test Method for Evaluating Degree of Blistering of Paints" and ASTM D661-93 "Standard Test Method for Evaluating Degree of Cracking of Exterior Paints", improved resistance to surfactant or other additive leaching as measured according to methods described herein. A modified version of the ASTM D5589-19 method "Standard Test Method for Determining the Resistance of Paint Films and Related Coatings to Algal Defacement" can be used to show reduced leaching of paint components in the exemplary compositions. The dried film may also be less susceptible to mildew or fungal growth and defacement than identical paints or coatings that do not include the chitosan compound. In some embodiments, coatings containing the chitosan compound may require reduced amounts of traditional fungicides like zinc oxide.

In embodiments of the present invention, chitosan is incorporated into said paints and coatings, wherein the chitosan ranges in particle size in said paints and coatings from 2 to 30 µm, 2 to 25 µm, 2 to 16 µm, or 4 to 16 µm, or less than 30 µm, less than 25 µm, less than 20 µm, or less than 16 µm.

In further useful embodiments of the present invention, chitosan is incorporated into said coatings from 0.02 to 1.0, 0.02 to 0.75, 0.05 to 0.40, or 0.02 to 0.30 percent by weight of dry coating solids.

In another embodiment, the paint or coating composition of the present invention may also include a pigment and extenders or fillers. The paint or coating composition of this embodiment has one or more of the following characteristics: pigment volume concentration (PVC) of less than 60, about 25% to about 65% by weight solids, at least 17% by weight binder polymer solids up to about 55% by weight binder polymer solids, and at least 10% by weight of a hiding pigment, for example, titanium dioxide. Further, the paint or coating composition may have one or more of the following qualities: improved dispersion of chitosan with chitosan particles in the paint or coating having particle size from 2 to 30 µm, 2 to 25 µm, 2 to 16 µm, or 4 to 16 µm, or less than 30 µm, less than 25 µm, less than 20 µm, or less than 16 µm and being evenly distributed, improved elongation in dried film form, improved thermocycling characteristics, improved resistance to surfactant or other additive leaching, and less susceptibility to fungal defacement in dried film form.

In further embodiments, said coating includes biocide additives. Such biocide additives may be selected by one having skill in the art to provide adequate additional mildew or fungal protection or other biocidal function, including but not limited to in-can preservation or dry film preservation.

In another embodiment of the invention, a method of manufacture is provided whereby a coating is made, the coating comprising water, latex binder resin, and additives, wherein such additives include, but are not limited to, a chitosan compound. The added chitosan is of relatively small particle size, in some embodiments less than 200 µm and others 100 µm. In certain other embodiments, a small particle size chitosan is obtained from traditional sources of chitosan by applying high rates of shear (e.g., as applied to pigment in the pigment grind stage of paint making) to an aqueous acetic acid solution containing chitosan and adding base (e.g. ammonium hydroxide) to neutralize the solution and precipitate out the chitosan from solution. In certain embodiments of the method of manufacture, the coating further comprises a pigment, and the chitosan is incorporated into the coating during the pigment grind stage. In certain embodiments of the method, the coating is further coated on an article and allowed to dry. The wet coating has a pH above 7, while the dry coating has a pH below 7, in certain embodiments from 5 to 6. The deacetylated, primary amine of the chitosan is present in the film in its protonated state.

DEFINITIONS

A "latex" polymer means a dispersion or emulsion of polymer particles formed in the presence of water and one or more dispersing or emulsifying agents (e.g., a surfactant, alkali-soluble polymer, or mixtures thereof) whose presence is required to form the dispersion or emulsion. The dispersing or emulsifying agent is typically separate from the polymer after polymer formation. In some examples, a reactive dispersing or emulsifying agent may become part of the polymer particles as they are formed.

The recitation of a numerical range using endpoints includes all numbers subsumed within that range (e.g., 1 to 5 includes 1, 1.5, 2, 2.75, 3, 3.80, 4, 5, etc.).

The terms "a," "an," "the," "at least one," and "one or more" are used interchangeably. Thus, for example, an aqueous coating composition that contains "an" additive means that the aqueous coating composition includes "one or more" additives.

The terms "comprises" and variations thereof do not have a limiting meaning when those terms appear in the description and claims. Such terms will be understood to allow the inclusion of a state step, element, or group of steps or elements but not the exclusion for any other step or element or group of steps or elements.

The words "preferred" and "preferably" refer to embodiments of the disclosure that may afford certain benefits under certain circumstances. However, other embodiments may also be preferred under the same or other circumstances. Furthermore, the recitation of one or more preferred embodiments does not imply that other embodiments are not useful, and is not intended to exclude other embodiments from the scope of the disclosure.

Herein, all numbers are assumed to be modified by the term "about" and preferably the word "exactly." When used in connection with a measured quantity, the term "about" refers to the variation in the measured quantity as would be expected by a skilled artisan making the measurement and exercising a level of care commensurate with the purpose of the measurement and the measuring equipment used.

Unless otherwise indicated by the context of a claim, methods steps may be performed in any order.

DETAILED DESCRIPTION OF THE INVENTION

The present invention comprises, in one embodiment, a paint or coating composition comprising water, latex binder resin, and additives, wherein such additives include, but are not limited to, a low molecular weight chitosan composition having a pH of less than 6.5, wherein the paint or coating composition has a pH of between about 8 and about 10.

In some embodiments, the low molecular weight chitosan compound has a number average molecular weight (Mn) of at most 40,000. In some embodiments, the low molecular weight chitosan compound has a number average molecular weight (Mn) of at most 25,000. In other embodiments, the low molecular weight chitosan compound has a number average molecular weight of at most 10,000.

In some embodiments, the low molecular weight chitosan compound has a weight average molecular weight (Mw) of at most 35,000. In some embodiments, the low molecular weight chitosan compound has a weight average molecular weight (Mw) of at most 55,000. In other embodiments, the low molecular weight chitosan compound has a weight average molecular weight of at most 75,000.

In some embodiments, the low molecular weight chitosan compound has a z-average molecular weight (Mz) of at most 200,000. In some embodiments, the low molecular weight chitosan compound has a z-average molecular weight (Mz) of at most 175,000. In other embodiments, the low molecular weight chitosan compound has a weight average molecular weight of at most 150,000. In still other embodiments, the low molecular weight chitosan compound has a weight average molecular weight of at most 125,000.

In some embodiments, the polydispersity index Mw/Mn of the low molecular weight chitosan compound is at least 3. In other embodiments, the polydispersity index Mw/Mn of the low molecular weight chitosan compound is at least 4. In other embodiments, the polydispersity index Mw/Mn of the low molecular weight chitosan compound is at least 5. In other embodiments, the polydispersity index Mw/Mn of the low molecular weight chitosan compound is at least 6. In still other embodiments, the polydispersity index Mw/Mn of the low molecular weight chitosan compound is at least 7.

In some embodiments, the chitosan compound additive has a particle size of less than 30 microns in the paint or coating, determined using ASTM D1210-05 "Standard Test Method for Fineness of Dispersion of Pigment-Vehicle Systems by Hegman-Type Gage". In another embodiment, the invention comprises a coated article formed from a paint or coating composition comprising water, latex binder resin, and additives, wherein such additives include but are not limited to, a chitosan compound and wherein the paint or coating composition dries to form a film on the coated article. The chitosan compound is distributed throughout the film on the coated article. In some embodiments, the chitosan compound additive has as particle size less than 30 microns when dispersed in a paint or coating, determined using ASTM D1210-05. Hegman gauge values below 30 microns are also indicative of adequate dispersibility of the chitosan. The dried paint or coating film displays improved elongation as measured according to ASTM D2370-16 "Standard Test Method for Tensile Properties", improved thermocycling characteristics using the rating scales according to ASTM D714-02 "Standard Test Method for Evaluating Degree of Blistering of Paints" and ASTM D661-93 "Standard Test Method for Evaluating Degree of Cracking of Exterior Paints", improved resistance to surfactant or other additive leaching as measured according to methods described herein. A modified version of the ASTM D5589-19 method "Standard Test Method for Determining the Resistance of Paint Films and Related Coatings to Algal Defacement" can be used to show reduced leaching of paint components in the exemplary compositions. The dried film may also be less susceptible to mildew or fungal growth and defacement than identical paints or coatings that do not include the chitosan compound. In some embodiments, coatings containing the chitosan compound may require reduced amounts of traditional fungicides like zinc oxide.

In embodiments of the present invention, chitosan is incorporated into said paints and coatings, wherein the chitosan ranges in particle size in said paints and coatings from 2 to 30 μm, 2 to 25 μm, 2 to 16 μm, or 4 to 16 μm, or less than 30 μm, less than 25 μm, less than 20 μm, or less than 16 μm.

In further useful embodiments of the present invention, chitosan is incorporated into said coatings from 0.02 to 1.0, 0.02 to 0.75, 0.05 to 0.40, or 0.02 to 0.30 percent by weight of dry coating solids.

In another embodiment, the paint or coating composition of the present invention may also include a pigment and extenders or fillers. The paint or coating composition of this embodiment has one or more of the following characteristics: pigment volume concentration (PVC) of less than 60, about 25% to about 65% by weight solids, at least 17% by weight binder polymer solids up to about 55% by weight binder polymer solids, and at least 10% by weight of a hiding pigment, for example, titanium dioxide. Further, the paint or coating composition may have one or more of the following qualities: improved dispersion of chitosan with chitosan particles in the paint or coating having particle size from 2 to 30 μm, 2 to 25 μm, 2 to 16 μm, or 4 to 16 μm, or less than 30 μm, less than 25 μm, less than 20 μm, or less than 16 μm and being evenly distributed, improved elongation in dried film form, improved thermocycling characteristics, improved resistance to surfactant or other additive leaching, and less susceptibility to fungal defacement in dried film form.

In further embodiments, said coating includes biocides additives. Such biocide additives may be selected by one having skill in the art to provide adequate additional mildew or fungal protection or other biocidal function, including but not limited to in-can preservation or dry film preservation.

In another embodiment of the invention, a method of manufacture is provided whereby a coating is made, the coating comprising water, latex binder resin, and additives, wherein such additives include, but are not limited to, a chitosan compound. The added chitosan is of relatively small particle size, in some embodiments less than 200 μm and others 100 μm. In certain other embodiments, a small particle size chitosan is obtained from traditional sources of chitosan by applying high rates of shear (e.g., as applied to pigment in the pigment grind stage of paint making) to an aqueous acetic acid solution containing chitosan and adding base (e.g. ammonium hydroxide) to neutralize the solution and precipitate out the chitosan from solution. In certain embodiments of the method of manufacture, the coating further comprises a pigment, and the chitosan is incorporated into the coating during the pigment grand stage. In certain embodiments of the method, the coating is further coated on an article and allowed to dry. The wet coating has a pH above 7, while the dry coating has a pH below 7, in certain embodiments from 5 to 6. The deacetylated, primary amine of the chitosan is present in the film in its protonated state.

Chitosan Additive

The term "chitosan" as used herein refers to derivatives of naturally occurring chitin having the following general chemical structure:

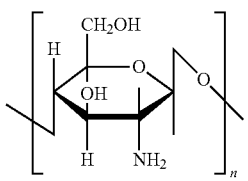

Formula I wherein n indicates the number of repeating structural units in a polymeric or oligomeric structure. Minor chemical variations in this structure are possible and will be recognized by persons having skill in the art. Chitosan may also be obtainable from other sources recognized by those having skill in the art.

Chitosan is obtainable from a number of sources by deacetylation of naturally occurring chitin. Exemplary sources of chitosan are available in different molecular weights, and ordinarily provided in acidic solution from Tidal Vision Inc. located in Bellingham, WA, Millipore Sigma, a subsidiary of Merk KGaA headquartered in Burlington, VT, Qingdao Yunzhou Biochemistry Co. Ltd. Qingdao, China, KitoZyme LLC (providing vegan-sourced chitosan) located in Herstal, Belgium, and Kimica Corporation located in Chuo-ku. Chitosan can be obtained in a dry flake form, in acidic solution, or other form. The aqueous chitosan composition of the present invention is acidic, having a pH of less than 6.5 prior to addition to a coating composition.

In some embodiments of the present invention, the chitosan compound is a low molecular weight chitosan compound. In some embodiments the low molecular weight chitosan compound has number average molecular weight (Mn) of at most 40,000, preferably, at most 25,000, and even more preferably at most 10,000. In some embodiments, the low molecular weight chitosan compound has a weight average molecular weight (Mw) of at most 35,000, preferably at most 55,000, and even more preferably at most 75,000.

In some embodiments, the low molecular weight chitosan compound has a z-average molecular weight (Mz) of at most 200,000, preferably at most 175,000, even more preferably at most 150,000, and yet even more preferably at most 125,000.

In some embodiments, the polydispersity index of the low molecular weight chitosan compound Mw/Mn is at least 3, preferably at least 4, preferably at least 5, preferably at least 6, preferably at least 7.

Molecular weight may be determined by gel permeation chromatography using the following experimental conditions. Column: TSKgel G5000+G3000 columns. Solvent: 0.3M sodium chloride and 5% acetic acid solvent. Temperature: 30° C. Flow rate: 1.0 mL/min. Injection volume: 100 μL, Detector: Knauer 8×DRI. Data module: GPC Pro 3.13.

Chitosan compounds having low molecular weight may be incorporated into the coating compositions in higher loading amounts due to the lower viscosity of chitosan compounds having low molecular weight compared to higher molecular weights. The greater dispersion of a chitosan compound results in a coating composition that when dried, exhibits greater tensile strength than coating compositions formed with chitosan compounds having higher molecular weight. This effect is seen in both low molecular weight when both chitosan compounds and higher molecular weight chitosan compounds are employed.

In some embodiments, the low molecular weight chitosan compound has a viscosity of at most 5000 centipoise, at most 2500 centipose, or at most 1500 centipose when measured at 21° C. at a concentration of 4% chitosan in aqueous solution with pH between 3.5 and 4.

Viscosity of the chitosan compound may be measured by the method in ASTM D-2196, test method A, and is reported in centipoise (cp). Stormer (KU) viscosity of the coating composition may be measured by the method in ASTM D562-10 titled "Standard Test Method for Consistency of Paints Measuring Krebs Unit (KU) Viscosity Using a Stormer-Type Viscometer In some embodiments, the low molecular weight chitosan compound may be incorporated into a coating composition at a loading level of at least 0.20 weight percent based on the weight of solids of the coating composition, preferably at least 0.21 weight percent based on the weight of solids of the coating composition. Particle size of conventionally available sources of chitosan and those used in the relevant art range are commonly above 60 microns when added to paint or coatings formulations as measured by Hegman gauge drawdown. These relatively large particle sizes result in gritty appearing, poorly applying paints or coatings that are unacceptable for commercial application. Additionally, larger particles have less available surface area per equivalent mass for interaction with other components of the paint.

In embodiments of the present invention, Chitosan compounds added to paints or coatings of the present invention are of particle size from 2 to 30 µm, 2 to 25 µm, 2 to 16 µm, or 4 to 16 µm, or less than 30 µm, less than 25 µm, less than 20 µm, or less than 16 µm as measured by Hegman gauge drawdown. Without being bound by theory, it is believed that the smaller particle size of the chitosan in the paints and coatings of the present invention and resulting greater surface area per equivalent mass allows for greater interaction with components like surfactants, potentially resulting in less leaching of coating materials. One specific theorized interaction could be hydrogen bonding occurring between the chitosan and any polar monomers in the binder polymer of a paint or coating, perhaps allowing for additional positive properties like improved elongation and thermocycling.

In embodiments of the present invention, chitosan is believed to act in one sense analogously to a filler or extender particle. Extenders or fillers may be used to reduce the quantity of the pigment required to achieve a desired hiding ability, sheen, etc., without significantly affecting the color of a paint or coating established by the pigment. Exemplary, conventional fillers include, for example, sodium-potassium alumina silicates such as MINEX® 4 and MINEX® 10 (sold by Unimin Corporation). When used, such fillers may be employed in any desired amount.

Paint and Coatings Compositions and Methods of Preparations of Same

A paint or coating composition made in accordance with the present invention may comprise chitosan in amounts from about 0.02 to 1.0, 0.02 to 0.75, 0.05 to 0.40, or 0.02 to 0.30 percent by weight of dry coating solids. Persons having skill in the art, in light of this disclosure, will appreciate that the amount of chitosan that can be added to a paint or coating formulation will vary based on the amount of other pigments or fillers/extenders in the paint or coating, which is indicated by the coating's base designation and/or sheen. In an ultra-deep coating, for example, additional chitosan, which behaves like a filler when properly dispersed in a paint or coating formulation, could be added, perhaps in greater amounts than the ranges provided above. The maximum amount of chitosan that can be added to a paint or coatings formulation, like with other extenders or fillers, is bounded by an increasing viscosity when a threshold amount of chitosan is added. However, more chitosan compound can be added to a coating composition at an acceptable viscosity when a low molecular weight chitosan compound is used.

Paint or coating compositions in accordance with the present invention generally comprise at least about 17%, for example, at least about 17.5% by weight, to about 55% by weight of binder polymer solids. Binders useful in latex paint compositions are known in the art and include polymeric binders, such as acrylics, vinyl acrylics, or styrene acrylics binders. Other binder suitable for waterborne paint and coatings formulations may also be used and include but are not limited to polyurethane dispersions, waterborne alkyds, and mixtures or modifications thereof. In one embodiment of the present invention, the paint or coating composition is formulated to have a binder that does not result in precipitation of components or the formation of grit. The paint and coatings compositions of the present invention may further comprise at least about 5% by weight pigments. Such pigments may comprise inorganic pigments, such as titanium dioxide. Exemplary paint and coatings compositions comprise at least about 11% by weight, further for example, at least about 12% by weight, further for example, at least about 13% by weight, further for example, at least about 14% by weight, further for example at least about 15% by weight, further for example, at least about 16%, further for example at least about 17%, further for example, at least about 18%, further for example at least about 19%, and even further for example at least about 20% up to about 30% by weight titanium dioxide. In another useful embodiment, the paint or coating composition comprises more than 10% titanium dioxide. Other colored pigments or dyes may also be added to the paint, alone or in combination, to produce a wide range of colored paint. Suitable additional pigments may include calcium carbonate, talc, clay, silicates, aluminum silicates, calcium metasilicates, aluminum potassium silicates, magnesium silicates, barium sulfates, nepheline syenite, feldspar, zinc oxides or sulfides, or others known to those skilled in the art. Such additional colored pigments may be included in amounts up to about 30% by weight, for example, about 10% to about 20%. In some cases, "pigments" may also refer to functional fillers which are non-water-soluble solids. Such functional fillers may include solids which provide additional functional characteristics to the paint, for example, intumescent ingredients, such as ammonium polyphosphates, melamines, pentaerythritol and similar compounds. In one useful embodiment, the coating composition of the present invention is substantially free or totally free of intumescent ingredients such as ammonium polyphosphates, melamines, and pentaerythritol and similar compounds. In further embodiments, paints and coatings comprise no or substantially no pigment and are considered "clear coats" for application to various substrates.

The pigment volume concentration, or PVC, of a coating is the ratio of the volume of pigments (including functional fillers and fillers or extenders) to the volume of total non-volatile material (i.e. pigment and binder) present in the coating. The coating of the present invention preferably has a PVC of about 5 to about 60. In addition, the coating composition of the present invention has a maximum solids content of less than 65% by weight, for example, about 25% by weight to about 60% by weight, further for example about 30% by weight to about 58% by weight. In certain embodiments, the PVC of the present invention can be zero.

The paints and coatings disclosed herein may also include various other additives, including but not limited to thickeners, such as urethane thickeners, and acrylic thickeners in amounts up to about 10% by weight, for example about 1% to about 2%. Synthetic organic materials might also be incorporated; these include plastic beads, hollow spheres or other similar materials. Other optional components include glycols such as ethylene and/or propylene glycol in amounts up to about 7% and other solvents such as diethylene glycol dibenzoate and dipropylene glycol dibenzoate in amounts up to about 3%. The coating composition may also contain pigment dispersing agents which can be solvents or surfactants; wet paint preservatives; dry film preservatives; foam control agents such as oils, fatty acids and silicones; slip and mar additives; adhesion promoters, and/or other known paint additives.

The paint or coating composition of the present invention may also comprise biocides including but not limited to metal ion containing compounds, polymeric biocides, heterocyclic compounds, phenols, organometallics, aldehydes, proteins, peroxygens, alcohols, enzymes, polypeptides, cationic surfactants (including quaternary ammonium compounds), and halogen releasing compounds.

Paints and coatings made in accordance with the present invention are generally formulated to have a pH between 7 and 11 in the wet state ("in-can" prior to application and curing on a substrate). In exemplary embodiments, the wet state pH is from 8-10, or in other embodiments, 9-10. Various pH modifiers can be used to regulate wet-state pH. The pH of a paint or coating is very important to provide for dispersibility and compatibility of all of the other components conventionally used in paint and coatings making. Conventional methods of incorporating chitosan into a coating involve providing the coating as an acidic solution, having a significantly lower pH in the wet state that is friendly to the dissolving of chitosan in the wet-state coating. The present invention involves the dispersion of chitosan in a traditional, higher pH wet-state coating, which allows formulation with otherwise conventional materials; a formulation toolbox that is convenient and cost-effective for a paint and coating formulator.

It should be noted that in order to make a waterborne paint or coating formulation, an appropriate dispersant/surfactant system is needed in order to disperse the polymer and pigments in the paint or coatings formulation. The process for selecting dispersants/surfactants for paint and coatings formulations is well known to those of ordinary skill in the paint formulation art. One of ordinary skill in the art would be able to select a dispersant/surfactant combination in order to make a desired paint or coating composition having good stability characteristics.

Method of Preparing a Coating Composition

The invention encompasses in some embodiments a method for preparing a coating composition. Generally, a method of making a coating composition can comprise conventional manufacturing methods for forming a paint or coating and then the addition of the chitosan compound. Conventional manufacturing processes often involve four or more stages, these including pre-thin stage, a grind stage, a wash stage, and a thindown or letdown stage. In the pre-thin stage, one or more binder resins may be blended together with a carrier liquid within a thindown tank. Low-shear mixing may be applied in the thindown tank to form a pre-thin mixture. In the grind stage, pigments and other additives that will not homogenize under low-shear mixing may be dispersed into a carrier liquid under high shear conditions. The grind stage may be carried out in a high-shear mixing device, such as mill. The high shear applied in the grind stage breaks up agglomerates of particles and wet particles with a liquid. The composition of the liquid added when thinning the grind may be the same as or different from the composition of the carrier liquid used when preparing the grind. Next, in a wash stage, a wash liquid, which may have a composition that is the same as or different from the composition of the carrier liquid, may be pumped into the high-shear mixing device to move the grind paste into the thindown tank. Finally, in a thindown stage, the grind paste, the carrier liquid, the wash liquid, and the pre-thin mixture including any other additional additives may be blended together in the thindown tank under low shear conditions. In this stage, the coating composition concentrate may be further let down through further addition of liquid, which may have the same composition as or a different composition from the carrier liquid. The method may employ these conventional stages, or the coating composition may be prepared by other suitable methods. For example, the method may employ continuous manufacturing using component slurries.

One or more additives may be added at any suitable point during the manufacturing process, such as during the pre-thin stage, a grind stage, a wash stage, and a thindown or letdown stage.

Figure 6A:
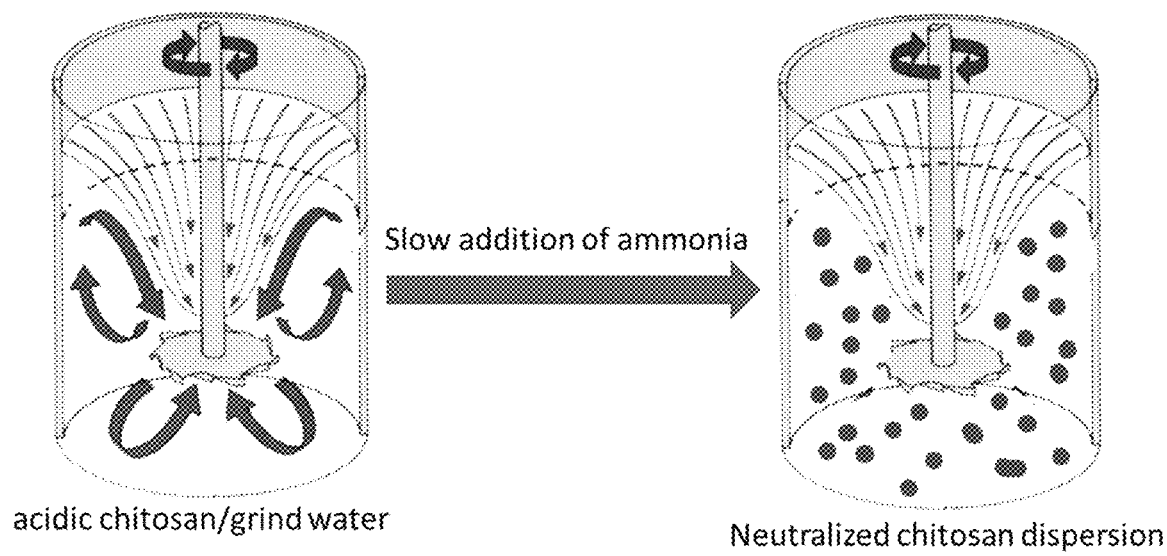
FIG. 6A is an illustration of incorporation of an acidic chitosan solution into a paint or coating during the grind stage, to yield a neutralized chitosan dispersion following slow addition of ammonia.
Figure 6B:
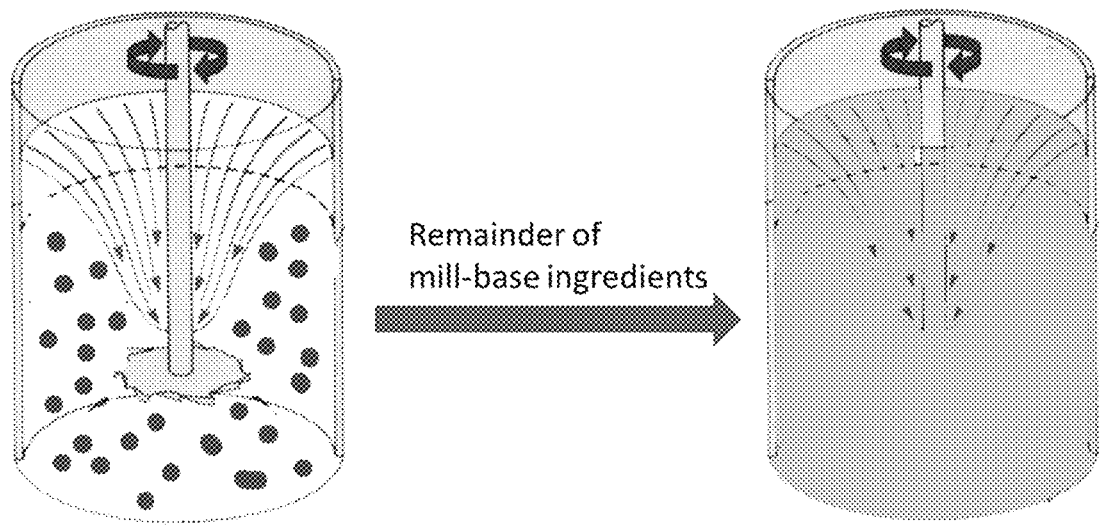
FIG. 6B illustrates the subsequent addition of the remainder of mill-based ingredients.

The chitosan compound can be added in acidic-aqueous or other solution to the paint or coating and then neutralized by the addition of a base to precipitate the chitosan into dispersion in the paint or coating. The chitosan must be added such that it is present and dispersed in the paint or coating at a particle size from 2 to 30 µm, 2 to 25 µm, 2 to 16 µm, or 4 to 16 µm, or less than 30 µm, less than 25 µm, less than 20 µm, or less than 16 µm. In preferred embodiments, application of shear such as that used in a pigment grind phase of paint-making adequately maintains a stable dispersion of the precipitated chitosan to and allows for chitosan in the paint with particle sizes of from 2 to 30 µm, 2 to 25 µm, 2 to 16 µm, or 4 to 16 µm, or less than 30 µm, less than 25 µm, less than 20 µm, or less than 16 µm. In certain embodiments, chitosan is added to the pigment grind fluid during the pigment grind stage. In preferred embodiments, the chitosan compound, prior to being added to the grind fluid is dissolved in an acetic or other acid solution. A chitosan-in-acidic solution may also be provided directly (e.g. High Molecular Weight Chitosan Acetate Aqueous Solution with 3% chitosan and 6% acetic acid by weight available from Tidal Vision Inc.). In some embodiments, a low molecular weight chitosan acetate aqueous solution with 40 low molecular weight chitosan and 4% acetic acid by mass, also available from Tidal Vision Inc., may be incorporated. Once the chitosan acidic solution is incorporated into the grind water by pouring or any suitable addition method, the chitosan is precipitated into the grind water by the addition of base (for example, ammonia) forming a dispersion of the chitosan with the other grind fluid components. In certain embodiments, the chitosan acidic solution may be added to the grind water before any other grind fluid components are added. In certain embodiments, the chitosan acidic solution is added alongside or after the other grind components are added. In certain embodiments, the base is added slowly, under the shear of the pigment grind stage to allow for adequate mixing and to avoid rapid or localized precipitation of the chitosan. The dispersion is maintained throughout the paint or coating-making process and the chitosan remains in stable dispersion. FIGS. 6A and 6B illustrate part of this embodiment whereby the chitosan compound is incorporated into a paint or coating during the grind stage starting in a chitosan acetate aqueous solution. Exemplary chitosan-acid aqueous solutions are the "High Molecular Weight" Chitosan Acetate Aqueous Solution (3% chitosan by mass, 6% acetic acid by mass) and the "Low Molecular Weight" Chitosan Acetate Aqueous Solution (4% chitosan by mass, 4% acetic acid by mass), both available from Tidal Vision Inc.

Once prepared, the coating composition may be dispensed into a storage container, such as a paint can. The coating composition then may be transported and stored, such as in a warehouse or on a store shelf.

Coated Article with Dried Paint Film and Methods for Providing a Coated Article

In certain embodiments, an article is coated with the above-described paints and coatings containing the chitosan compound such that the coating forms a dried film on the article. The dried coating film displays superior properties over an identical dried film that does not contain the chitosan compound. One such improved set of properties is in elongation. Films of the present invention may show elongation improvements from 10% additional elongation to 50% additional elongation, 10% to 40%, 20% to 50%, or 15% to 35% as compared to identical films that do not contain chitosan and as measured according to ASTM D2370-16. Without being bound to theory, it is believed that hydrogen bonding may occur between the chitosan compound and any polar monomers in the binder polymer of a paint or coating to enable improved elongation. Binder polymers with increasingly polar monomers or an increased amount of polar monomers may exhibit increased elongation.

Dried films also show improved resistance to leaching of materials. Resistance to leaching is indicated by testing conducted using ASTM D5589-19, which traditionally is used to show resistance to algal defacement, but in the present case can be used to show reduced leaching by the absence of a ring of inhibition on exemplary samples. Dried films further appear to be less susceptible to fungal (including mildew) defacement than identical films not containing a chitosan compound. Susceptibility to mildew or fungal defacement can be determined using the method described in the Examples below or by any method acceptable to a person having ordinary skill in the art.

The coating composition may be employed for any suitable purpose. In some embodiments, the coating composition may be applied to interior or exterior architectural surfaces such as wood, drywall, masonry, metal, and plaster, or over a primer coating. In certain embodiments, the coating composition may be applied to metals, composites, and other materials as a protective coating. In other embodiments, the coating composition may be applied to a surface to impart dry-erase characteristics. For example, the surface may be a wall, which may have paint or a primer already applied to the surface of the wall, over which the coating can be applied to form a dry-erase surface. The coating composition may be applied with brush, roller, sponge, or spray gun, or other conventional painting or coating tool. The cured coating may have any suitable thickness, such as a thickness ranging from 0.05-2 mm with preferred thickness around 0.1 mm.

EMBODIMENTS

Certain embodiments of the present invention include:

Embodiment 1: A coating composition comprising: (a) a carrier liquid; (b) a binder polymer; and (c) an aqueous chitosan composition that includes a low molecular weight chitosan compound, the chitosan composition having a pH of less than about 6.5; wherein the coating composition has a pH between about 8 and about 10.

Embodiment 2: The coating composition of embodiment 1, wherein the chitosan compound is present in an amount of at least 0.20 weight percent based on the total weight of solids in the coating composition.

Embodiment 3: The coating composition of any of embodiments 1-2, wherein the chitosan compound is present in an amount of at least 0.21 weight percent based on the total weight of solids in the coating composition.

Embodiment 4: The coating composition of any of embodiments 1-3, wherein at a 4% aqueous solution of chitosan compound, the chitosan composition has a viscosity of less than 5000 centipoise.

Embodiment 5: The coating composition of any of embodiments 1-4, wherein at a 4% aqueous solution of chitosan compound, the chitosan composition has a viscosity of less than 2500 centipoise.

Embodiment 6: The coating composition of any of embodiments 1-5, wherein at a 4% aqueous solution of chitosan compound, the chitosan composition has a viscosity of less than 1500 centipoise.

Embodiment 7: The coating composition of any of embodiments 1-6, wherein the chitosan compound has a number average molecular weight of at most 40,000.

Embodiment 8: The coating composition of any of embodiments 1-7, wherein the chitosan compound has a number average molecular weight of at most 25,000.

Embodiment 9: The coating composition of any of embodiments 1-8, wherein the chitosan compound has a number average molecular weight of at most 10,000.

Embodiment 10: The coating composition of any of embodiments 1-9, wherein the chitosan compound has a weight average molecular weight of at most 75,000.

Embodiment 11: The coating composition of any of embodiments 1-10, wherein the chitosan compound has a weight average molecular weight of at most 55,000.

Embodiment 12: The coating composition of any of embodiments 1-11, wherein the chitosan compound has a number average molecular weight of at most 35,000.

Embodiment 13: The coating composition of any of embodiments 1-12, wherein the chitosan compound has a z-average molecular weight of at most 200,000.

Embodiment 14: The coating composition of any of embodiments 1-13, wherein the chitosan compound has a z-average molecular weight of at most 150,000.

Embodiment 15: The coating composition of any of embodiments 1-14, wherein the chitosan compound has a z-average molecular weight of at most 125,000.

Embodiment 16: The coating composition of any of embodiments 1-15, wherein the chitosan compound has a polydispersity index of at least 3.

Embodiment 17: The coating composition of any of embodiments 1-16, wherein the chitosan compound has a polydispersity index of at least 5.

Embodiment 18: The coating composition of any of embodiments 1-17, wherein the chitosan compound has a polydispersity index of at least 7. Embodiment 19: The coating composition of any of embodiments 1-18, wherein the carrier liquid comprises water.

Embodiment 20: The coating composition of any of embodiments 1-19, wherein the coating composition further comprises pigment.

Embodiment 21: The coating composition of any of embodiments 1-20, wherein the coating composition comprises 13% to 30% by weight pigment and the pigment is titanium dioxide.

Embodiment 22: The coating composition of any of embodiments 1-21, wherein the coating composition has a PVC below 60.

Embodiment 23: The coating composition of any of embodiments 1-22, wherein the coating composition has about 25% to about 65% by weight solids.

Embodiment 24: The coating composition of any of embodiments 1-23, wherein the coating composition has about 30% to about 60% by weight solids.

Embodiment 25: The coating composition of any of embodiments 1-24, wherein the coating composition comprises about 0.02% to about 1.0% by weight chitosan compound. based on the total weight of the coating composition.

Embodiment 26: The coating composition of any of embodiments 1-25, wherein the coating composition has a pH of between about 9 and about 10.

Embodiment 27: The coating composition of any of embodiments 1-26, wherein the chitosan compound has a particle size of less than 30 microns in the coating composition.

Embodiment 28: The coating composition of any of embodiments 1-27, wherein the chitosan compound has a particle size of less than 16 microns in the coating composition.

Embodiment 29: The coating composition of any of embodiments 1-28, wherein a film formed from the dried coating composition has a Hegman gauge rating of 5 or higher.

Embodiment 30: The coating composition of any of embodiments 1-29, wherein the coating composition has a viscosity under 120 KU.

Embodiment 31: A coated article comprising a substrate coated in the coating composition of any preceding claim.

Embodiment 32: The coated article of embodiment 31, wherein the coating composition forms a dried film on the article, and the dried film exhibits improved elongation as measured by ASTM D2370-16 and compared to an identical dried film having no chitosan compound.

Embodiment 33: The coated article of embodiment 31 or 32, wherein the coating composition forms a dried film on the article, and the dried film exhibits improved thermocycling properties as measured by ASTM D714-02 and ASTM D661-93 and compared to an identical dried film containing no chitosan compound.

Embodiment 34: The coated article of any of embodiments 31 through 33, wherein the coating composition forms a dried film on the article, and the dried film exhibits resistance to leaching compared to an identical dried film having no chitosan compound.

Embodiment 35: The coated article of any of embodiments 31 through 34, wherein the coating composition forms a dried film on the article, and the dried film exhibits reduced susceptibility to mildew or fungal defacement as compared to an identical dried film having no chitosan compound.

Embodiment 36: A method of making a coating composition, the method comprising: (a) providing a coating composition comprising a carrier liquid, binder polymer, and a pigment, wherein said coating composition is mixed in a grind stage and then mixed in a thindown stage; and (b) adding a low molecular weight chitosan compound to the coating composition during the pigment grind process and applying shear to the chitosan compound along with the grind fluid during the grind stage.

Embodiment 37: The method of embodiment 36, wherein the chitosan compound is provided in step (b) in an acetic acid and water solution, and the grind stage further comprises the addition of a neutralizer to precipitate the chitosan compound from the acetic acid and water solution while shear is applied in the grind stage.

EXAMPLES

Comparative and Example Paint Compositions

Comparative (or "Control") and Example paint compositions were prepared according to the weight percent amounts shown in TABLE 1, below.

TABLE 1

| | | Weight % in Paint | | | | | | |
|---|---|---|---|---|---|---|---|---|
| | Component | Positive Control Paint 1 | Positive Control Paint 2 | Negative Control Paint | Example Paint 1 | Example Paint 2 | Example Paint 3 | Example Paint 4 |
| THINDOWN STAGE | Proprietary, All Acrylic Latex (50% Solids) | 47 | 52.18 | 50 | 49 | 48.6 | 48.5 | 48.7 |
| | Defoamer A[1] | 0.28 | 0.32 | 0.3 | 0.3 | 0.3 | 0.3 | 0.3 |
| GRIND STAGE COMPONENTS | Water | 13.83 | 15.47 | 14.53 | 14.53 | 14.5 | 14.5 | 16.15 |
| | Defoamer A[1] | 0.23 | 0.27 | 0.25 | 0.25 | 0.25 | 0.25 | 0.1 |
| | Dry Chitosan Powder[2] | 0 | 0.2 | 0 | 0 | 0 | 0 | |
| | Chitosan Acetate Aqueous Solution (3% higher molecular weight chitosan)[3] | 0 | 0 | 0 | 6.3 | 6.3 | 6.3 | |
| | Chitosan Acetate Aqueous Solution (low molecular weight chitosan)[3a] | | | | | | | 5.4 |
| | Aqueous Ammonia[4] | 0.15 | 0.64 | 0.12 | 0.6 | 0.6 | 0.6 | |
| | Aqueous Neutralizer[4a] | | | | | | | 0.6 |
| | Extender A[5] | 0.1 | 0.11 | 0.1 | 0.1 | 0.1 | 0.1 | 0.1 |
| | Anionic dispersant | 0.48 | 0.53 | 0.5 | 0.5 | 0.53 | 0.78 | 0.54 |
| | ZnO (dry)[6] | 4.67 | 0 | 0 | 0 | 0.5 | 1 | 0 |
| | Fungicide[7] | 0.47 | 0 | 0 | 0 | 0 | 0 | 0 |
| | Traditional Biocides[8] | 0.11 | 0 | 0 | 0 | 0 | 0 | 0 |
| | Plasticizer A | 0.2 | 0.21 | 0.2 | 0.2 | 0.2 | 0.2 | 0.4 |
| | Extender B[9] | 1.4 | 1.6 | 1.5 | 1.5 | 1.4 | 1 | 1.5 |
| | Extender C[10] | 4.67 | 5.32 | 5 | 5 | 5 | 4.75 | 5 |
| | Titanium Dioxide (dry) | 21.75 | 17.68 | 22.26 | 16.6 | 16.6 | 16.6 | 16.6 |

TABLE 1-continued

| | Weight % in Paint | | | | | | |
|---|---|---|---|---|---|---|---|
| Component | Positive Control Paint 1 | Positive Control Paint 2 | Negative Control Paint | Example Paint 1 | Example Paint 2 | Example Paint 3 | Example Paint 4 |
| Plasticizer B | 0.37 | 0.43 | 0.4 | 0.4 | 0.4 | 0.4 | 0.2 |
| Photo-stabilizers | 0.34 | 0.39 | 0.37 | 0.37 | 0.37 | 0.37 | 0.2 |
| HEC Thickener | 0.07 | 0 | 0.07 | 0 | 0 | 0 | 0 |
| HEUR Thickeners | 3.64 | 4.37 | 4.16 | 4.1 | 4.1 | 4.1 | 4.2 |
| Defoamer B[11] | 0.23 | 0.27 | 0.25 | 0.25 | 0.25 | 0.25 | 0 |
| % dry chitosan compound loading by weight of coating composition | 0 | 0 | 0 | 0.1926 | 0.1926 | 0.1926 | 0.2141 |

[1]BYK ® 021 from Byk Chemie
[2]Dry Chitosan Powder, Low Molecular Weight available from Millipore Sigma
[3]Chitosan Acetate in Aqueous Solution (3% chitosan by weight, high molecular weight, 6% acetic acid by weight) available from Tidal Vision Inc.
[3a]Chitosan Acetate in Aqueous Solution (4% chitosan by weight, low molecular weight, 4% acetic acid by weight) available from Tidal Vision Inc.
[4]Aqueous Ammonium Hydroxide Solution (19.7% by weight)
[4a]2-amino-2-methyl-1-propanol (95%) in aqueous solution.
[5]ATTAGEL ® Clay 40 available from BASF
[6]Zinc Oxide (dry) available from Umicore Marketing
[7]POLYPHASE ® 663 available from Troy Corporation
[8]Isothiazolinone and Zinc Pyrithione Mixture
[9]ICEBERG ™ Calcined Kaolin Clay available from Burgess Pigments
[10]MINEX ™ 4 from Unimin Specialty Minerals
[11]BYK ® 021 from Byk Chemie As indicated in Table 1, varying levels of biocide and extender were added to the different paints to show the impact of chitosan addition while maintaining PVC across the various paint compositions. Minor variations in the amount of dispersant and thickeners used were also made across paints to maintain proper grind fluid viscosity, as will be appreciated by one having skill in the art. The Example and Control Paints were formed by mixing conventional paint components according to methods known in the art. Chitosan was incorporated into Example Paints 1, 2, and 3 by taking the Chitosan Acetate Aqueous Solution (3% by weight chitosan, 6% by weight acetic acid, high molecular weight solution available from Tidal Vision Inc.) and incorporating it into the grind water prior to other grind components being added by pouring. Example Paint 4 was generated by incorporating a 4% by weight chitosan, 4% by weight acetic acid, low molecular weight chitosan solution by pouring it into the grind water prior to other grind components. In some embodiments, following the Chitosan Acetate Aqueous Solution incorporation, Aqueous Ammonium Hydroxide Solution (19.7% by weight) was added slowly, over the course of 10 minutes, to neutralize and then bring the pH of the grind fluid up to about 9 to precipitate the chitosan into a dispersion in the grind water, all while high shear (typical of that applied in conducting a grind phase) was applied by a Cowles blade. This step results in the use of about 77% by weight of the Aqueous Ammonium Hydroxide Solution indicated in Table 1. The remaining grind fluid components, including about 23% of the Aqueous Ammonium Hydroxide Solution indicated in Table 1, were then added and each paint formed by conventional mixing techniques using the materials in Table 1. In other embodiments, a neutralizing solution of aqueous 95% 2-amino-2-methyl-1-propanol (95%) was added to the grind prior to addition of the catechol, which similarly was mixed at high shear with a Cowles blade to disperse the precipitated chitosan particles. Thus, the example paints were formed.

A final control paint, Positive Control Paint 2, was also formed using Dry Chitosan Powder (low molecular weight chitosan powder available from Millipore Sigma) added to the grind water prior to the addition of the other grind components by dropping the Dry Chitosan Powder into the grind water. Following the Dry Chitosan Powder addition, Aqueous Ammonium Hydroxide Solution (19.7% by weight) was added slowly, over the course of 10 minutes, to neutralize and then bring the pH of the grind fluid up to about 9, all while high shear (typical of that applied in forming a grind phase) was applied by a Cowles blade. This step results in the use of about 77% by weight of the Aqueous Ammonium Hydroxide Solution indicated in Table 1. The remaining grind fluid components, including about 23% of the Aqueous Ammonium Hydroxide Solution indicated in Table 1 were then added and each paint formed by conventional mixing techniques using the materials in Table 1. As shown in Table 1, more chitosan compound (higher loading) was successfully incorporated into the coating composition when a low molecular weight chitosan compound was used. The viscosity range of the 3% higher molecular weight chitosan additive (10,000-70,000 cps) is much higher than the viscosity range of the 4% low molecular weight chitosan additive (250-1500 cps).

Particle Size and Paint Quality Determinations

Figure 1B:
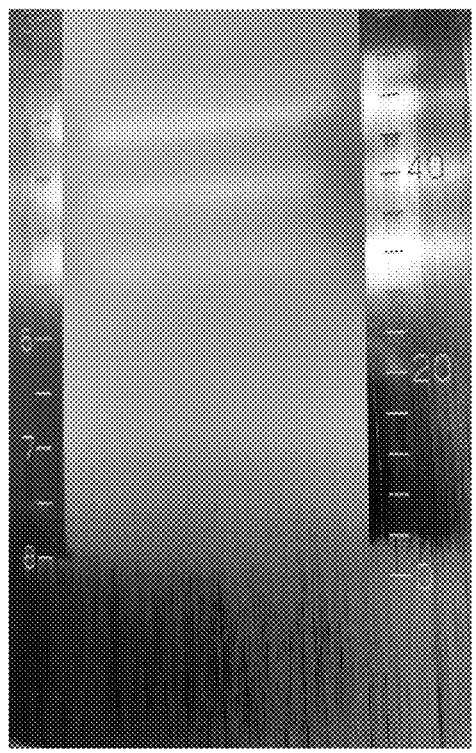
FIG. 1B shows a Hegman gauge drawdown of Example Paint 1.
Figure 2A:
FIG. 2A shows a microscopic image of a drawdown of Positive Control Paint 1.
Figure 2B:
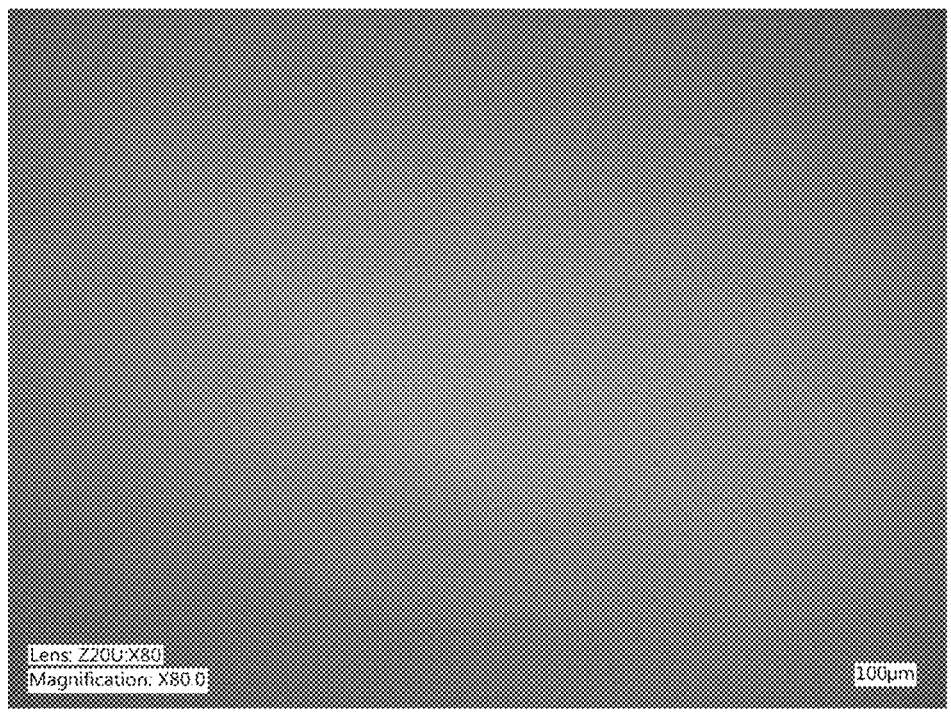
FIG. 2B shows a microscopic image of a drawdown of Example Paint 1.

Hegman drawdowns of both Positive Control Paint 2 and Example Paint 1 were conducted according to ASTM 1210-5 and particle size observed from the Hegman gauge drawdowns. FIG. 1A shows the drawdown of Positive Control Paint 2 and FIG. 1B shows the Hegman drawdown of Example Paint 1. Positive Control Paint 2 shows chitosan particle sizes in Positive Control Paint 2 in the 60-micron range and larger. Example Paint 1 shows particle sizes of 12 to 16 microns and smaller. Notably, the average particle size of Attagel Clay 40 (available from BASF Catalyst LLC), the largest non-chitosan particle in Positive Control Paint 2 or Example Paint 1 is 12 microns (as provided by the manufacturer). The differences in quality of appearance is further evident between the Positive Control Paint 2 and Example Paint 1 in FIGS. 2A and 2B. FIG. 2A shows Positive Control Paint 2 at 80× magnification using a Keyence optical microscope, and FIG. 2B shows Example Paint 1 at 80× magnification using a Keyence optical microscope. Drawdowns of both paints were formed using a 4-mil bird bar on white Leneta charts (available from the Leneta Co.).

Thermocycling Testing

Thermocycling testing was conducted on Positive Control Paint 1 and Example Paint 1 as shown below in Table 2. Cracking was evaluated and rated according to ASTM D661-93 and blistering was evaluated and rated according to ASTM D714-02. Films were applied using 1-inch wide paint brushes (polyester/nylon blend or china bristle) to three types of substrates for each paint. Two coats were applied for each sample with 24 hours dry time at 40° F. and 75% relative humidity for each coat, before heat or cold was applied for testing. Samples were then subjected to freezing or heating in accordance with the test method. The abbreviations in Table 2 correspond to the following substrates: GRA=Glossy red alkyd (alkyd paint applied over redwood 6×18 in. section); CLTX=Chalky latex (latex paint applied over redwood; 6×18 in. section); SYP=Southern yellow pine (uncoated; 6×18 in. section). Samples were made in triplicate and measurements averaged, yielding the below values.

TABLE 2

| | Thermocycling | | | | | |
|---|---|---|---|---|---|---|
| Paint | GRA Blister | GRA Crack | CLTX Blister | CLTX Crack | SYP Blister | SYP Crack |
| Positive Control Paint 1 | 4 | 10 | 8 | 10 | 10 | 10 |
| Example Paint 1 | 7 | 10 | 10 | 10 | 10 | 10 |

Elongation Testing

Elongation testing was conducted on Positive Control Paint 1 and Example Paint 1 as shown below in Table 3. Percent elongation was evaluated according to ASTM D2370-16. Films were made using a 10-mil 8-path bar to draw wet paint over standard release paper. This first coat was allowed to dry 1 day at 23° C. and 50% humidity. A second coat was drawn down using the same 8-path bar perpendicular to the first coat and allowed to dry for 7 days at 23° C. and 50% humidity. Films were peeled off of release paper and then cut to half-inch by 3-inch samples. Tensile and elongation testing was conducted on sample films using an Instron Tensiometer. Ten specimens were generated from each paint, with the five highest tensile strength samples selected for each paint and corresponding measurements averaged, yielding the below values (±indicating standard deviation).

TABLE 3

| Paint | Film Thickness (mil) | % Elongation | Tensile Strength (psi) |
|---|---|---|---|
| Positive Control Paint 1 | 4.1 ± 0.1 | 181.7 ± 18.3 | 354.9 ± 1.5 |
| Example Paint 1 | 4.0 ± 0.0 | 249.8 ± 2.1 | 221.1 ± 1.4 |
| Example Paint 4 | 4.1 ± 0.1 | 301.0 ± 33.0 | 224.9 ± 1.3 |

Resistance to Leaching Testing

Figure 5A:
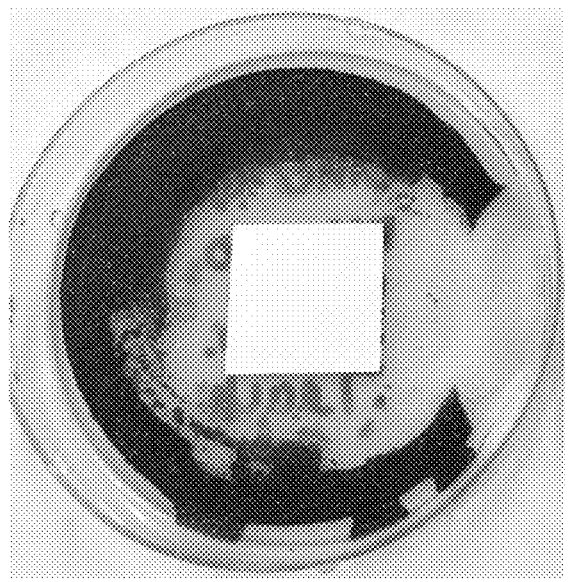
FIG. 5A, FIG. 5B, and FIG. 5C show images of drawdowns of the following paints on Whitman filter paper, after inoculation with an algae mixture and 3 weeks incubation per ASTM D5589-19.
Figure 5B:
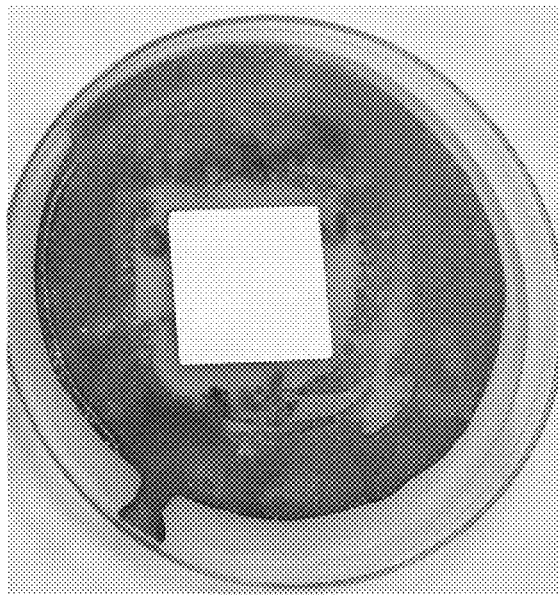
Figure 5C:
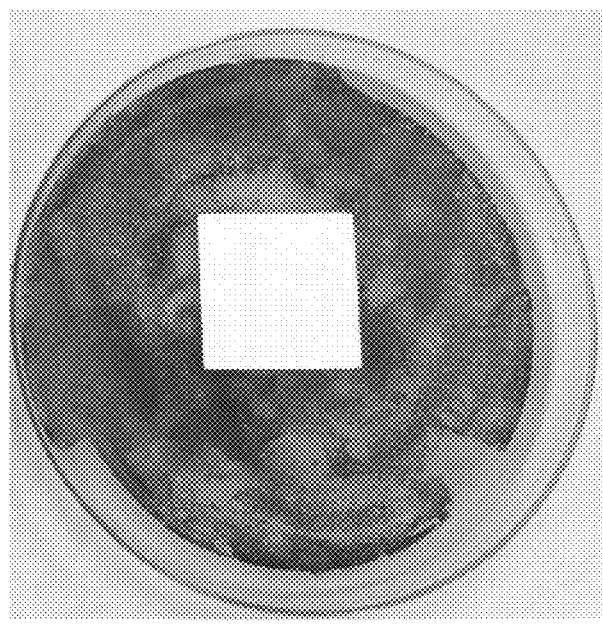

To characterize leaching of materials from paint films formed of the comparative and exemplary paints, Algal defacement testing was conducted on Positive Control Paint 1, Negative Control Paint, and Example Paint 1 generally following the method of ASTM D5589-19. Films were made by making drawdowns of each paint on #41 Whatman filter paper using a 4-mil Bird bar. Films were allowed to dry for 24 hours before being cut into 1-inch by 1-inch squares. Samples were immersed in standard deionized water for 48 hours to remove any mobile ions or water-soluble components that might affect the test. Samples were then placed on solidified B-11 agar plates. Samples were inoculated with 350 μL of an algae mixture including *Chlorella vulgaris* var *viridis, Oscillatoria lutea, Scenedesmus quadricauda*, and *Ulothrix gigas*. Samples were then placed in a Percival incubation chamber at constant temperature (25° C.) with a fluorescent light source to initiate growth. Samples were observed at 3 weeks following inoculation. FIG. 5A shows Positive Control Paint 1 at three weeks from inoculation, FIG. 5B shows Negative Control Paint at three weeks from inoculation, and FIG. 5C shows Example Paint 1. Ordinarily, ASTM D5589-19 is used for showing resistance to algal defacement, but as will be appreciated by one having skill in the art, observations from samples subjected to this test also show resistance to leaching. This can be observed in the absence of a "zone of inhibition" surrounding the painted filter paper substrate of Example Paint 1 shown in FIG. 5 and the presence of a zone of inhibition for both Positive Control Paint 1 (FIG. 5A) and Negative Control Paint (FIG. 5B).

Susceptibility to Fungal/Mildew Defacement

Figure 3A:
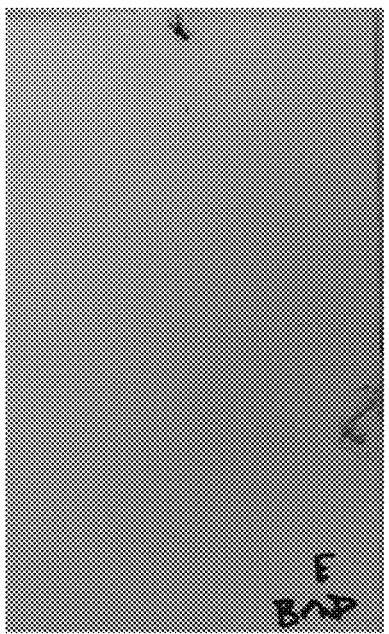
FIG. 3A, FIG. 3B, FIG. 3C, FIG. 3D, and FIG. 3E show Hardie boards painted with the following paints after 19 weeks in a 90° F., 95-98% relative humidity mildew chamber.
Figure 3B:
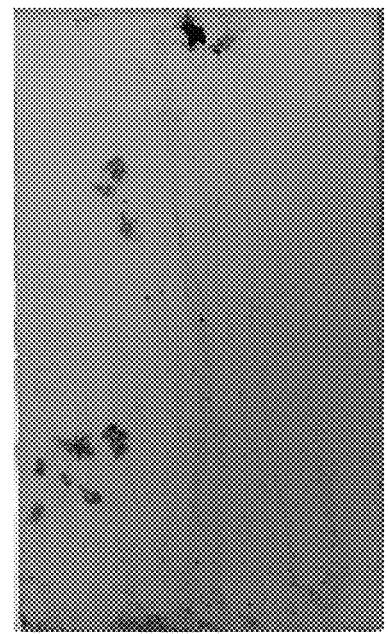
Figure 3C:
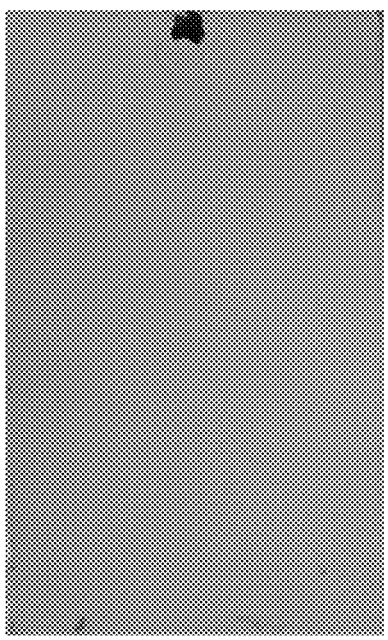
Figure 3D:
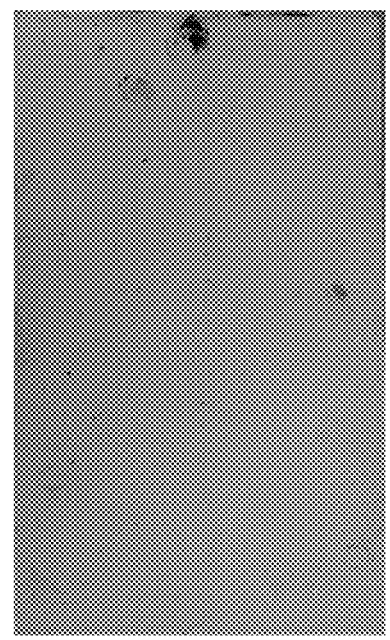
Figure 3E:
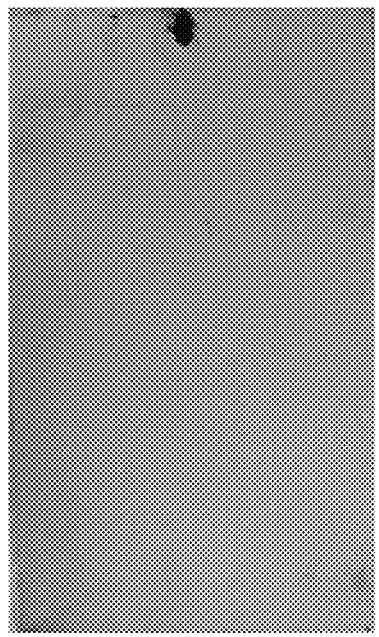
Figure 4A:
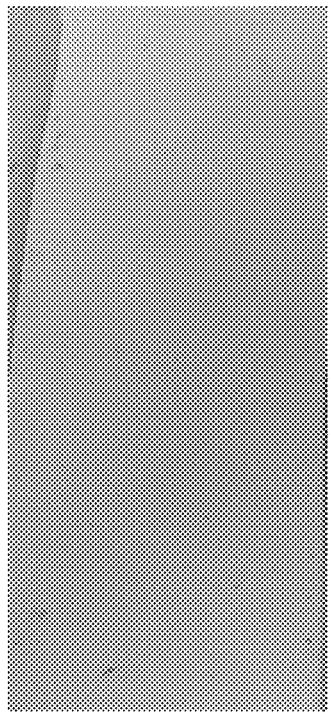
FIG. 4A, FIG. 4B, FIG. 4C, FIG. 4D, and FIG. 4E show the following paints applied to aluminum panels after 19 weeks in a 90° F., 95-98% relative humidity mildew chamber.
Figure 4B:
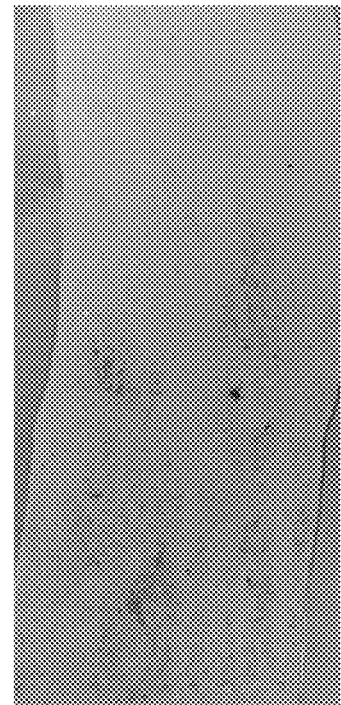
Figure 4C:
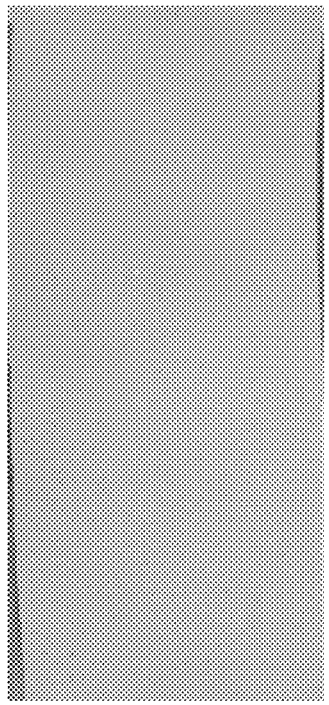
Figure 4D:
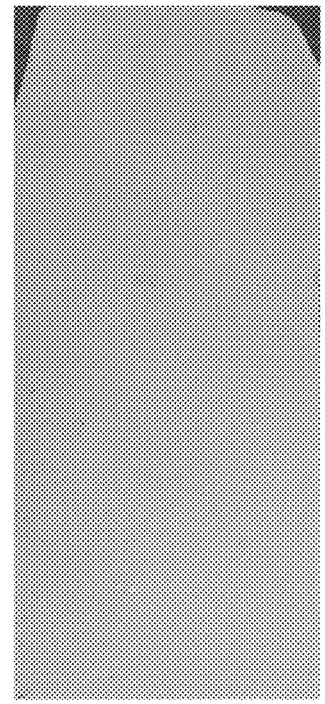
Figure 4E:
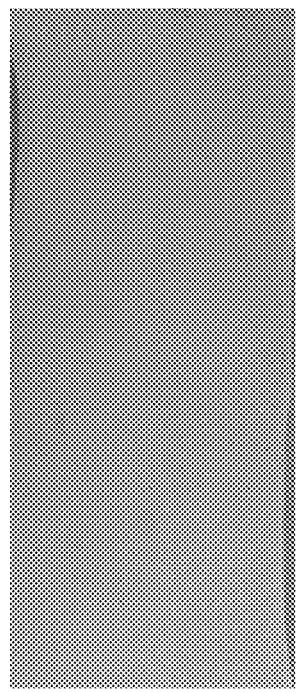

To illustrate reduced susceptibility to fungal/mildew defacement of the exemplary dried paint films, Positive Control Paint 1 and Experimental Paint 1 were applied to aluminum panels (available from Q-Lab, Westlake, OH) as well as Hardie board substrate. A 10 mil 8-path bar was used to apply each paint to the aluminum panels to give a final coating thickness of approx. 5 mil wet. The paints were applied to Hardie board by brush (2 coats) to give a similar final finish of 5 mil wet. Both sample sets were prepared in triplicate and allowed to cure fully under ambient conditions for 1 week prior to placement in a mildew cabinet with environmental control. Throughout the experiment, the mildew cabinet was kept at 90° F. (±2° F.) at 95-98% humidity. Vermiculite pieces were inoculated with *Aspergillus niger, Penicillium* Sp., and *Aureobasidium pullans* species fungal spores and placed on the mildew cabinet floor. The painted aluminum panels and Hardie board were hung randomly on racks in the mildew cabinet with no panel or board touching another or directly touching the inoculated vermiculite. Measurements are made by rating each panel or board according to the scale provided below in Table 4 and then averaging the triplicate results for each paint after 19 weeks of exposure. FIG. 3A shows a Hardie board painted with Positive Control Paint 1, FIG. 3B a Hardie board painted with Negative Control Paint, FIG. 3C shows a Hardie board painted with Example Paint 1, FIG. 3D shows a Hardie board painted with Example Paint 2, and FIG. 3e shows a Hardie board painted with Example Paint 3. FIG. 4A shows an aluminum panel painted with Positive Control Paint 1, FIG. 4B—an aluminum panel painted with Negative Control Paint, FIG. 4C shows an aluminum panel painted with Example Paint 1, FIG. 4D shows an aluminum panel painted with Example Paint 2, and FIG. 4E shows an aluminum panel painted with Example Paint 3. All boards and panels are shown after 19 weeks in a mildew chamber, when the ratings were made.

TABLE 4

| Rating | Relative Mildew Growth |
| --- | --- |
| 0 | 0% panel covered with growth |
| 3 | 30% panel covered with growth |
| 5 | 50% panel covered with growth |
| 7 | 70% panel covered with growth |
| 10 | 100% panel covered with growth |

Rating results are provided below in Table 5. Reported ratings are the average of triplicate sample runs for each paint on each substrate.

TABLE 5

| Paint | Hardie Board Substrate | Aluminum Panel Substrate |
| --- | --- | --- |
| Positive Control Paint 1 | 1 | 1 |
| Negative Control Paint | 4 | 5 |
| Example Paint 1 | 0 | 1 |
| Example Paint 2 | 2 | 1 |
| Example Paint 3 | 3 | 1 |

Figure 7A:
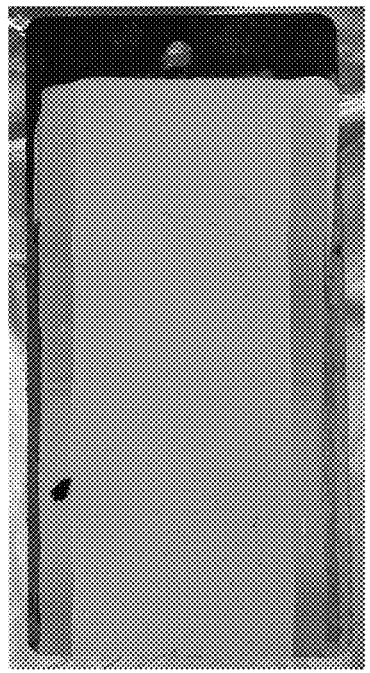
FIG. 7A, FIG. 7B, and FIG. 7C show the following paints applied to aluminum panels after 5 weeks in a 90° F. 95-98% relative humidity mildew chamber.
Figure 7B:
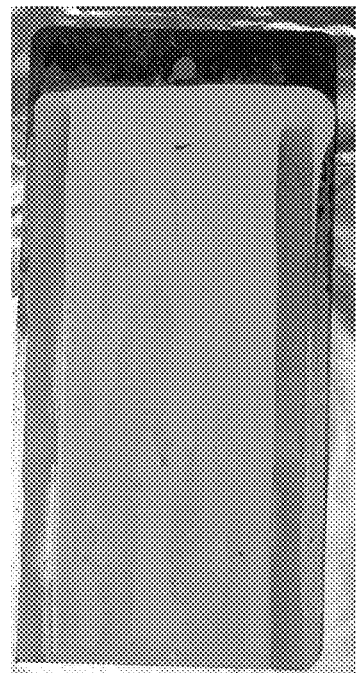
Figure 7C:
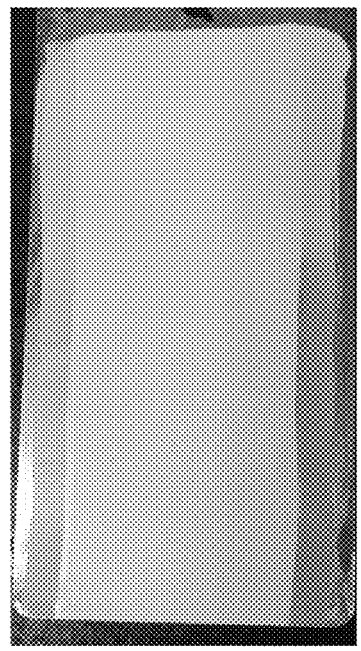

Further demonstration of reduced susceptibility of the disclosed dried film paints to microbial growth and fungal defacement was made. Samples of Positive Control Paint 1, Negative Control Paint, and Example Paint 4 applied to aluminum panels and hardie board according to the application technique described above. The samples were allowed to cure for one week prior to placement in a mildew cabinet with environmental control kept at 90° F. (±2° F.) at 95-98% humidity. Vermiculite pieces were inoculated with *Aspergillus niger*, *Penicillium* Sp., and *Aureobasidium pullans* species fungal spores and placed on the mildew cabinet floor. The painted aluminum and hardie board panels were hung randomly on racks in the mildew cabinet with no panel touching another or directly touching the inoculated vermiculite. Measurements are made by rating each panel or board according to the scale provided in Table 4 after 5 weeks of exposure in the mildew cabinet. FIGS. 7A and 7B shows show an aluminum panel painted with, respectively, the Positive Control Paint 1, and Negative Control Paint of Table 1 after five weeks of mildew cabinet exposure. FIG. 7C shows an aluminum panel painted with Example Paint 4 of Table 1 modified to match the rheology of Positive Control Paint 1, after 5 weeks of mildew cabinet exposure. Rating results are shown in Table 6.

TABLE 6

| Paint | Aluminum Panel Substrate |
| --- | --- |
| Positive Control Paint 1 | 1 |
| Negative Control Paint | 5 |
| Modified Example Paint 4 | 0 |

The invention claimed is:

1. A method of making a coating composition comprising:
blending a binder, a surfactant, and a first aqueous carrier to form a pre-thin:
adding an aqueous solution of chitosan having a number average molecular weight of at most 40,000 or a weight average molecular weight of at most 75,000 or a z-average molecular weight of at most 200,000 and having a pH of less than 6.5, a pigment and a second aqueous carrier liquid, optional additives, and a base to precipitate the chitosan into precipitated chitosan;
grinding, in grind stage, the pigment with the second aqueous carrier liquid, precipitated chitosan and optional additives, to disperse the pigment, precipitated chitosan, and optional additives into a grind paste;
adding, in a wash stage using a wash liquid, the grind paste to the pre-thin;
blending, in a thindown stage, the grind paste and the pre-thin to form a coating composition having a pH of about 8 to about 10.

2. The method of claim 1, further comprising dispensing the coating composition into a storage container.

3. The method of claim 2, wherein the storage container is a paint can.

4. The method of claim 1, wherein the aqueous solution of chitosan is chitosan in aqueous acetic acid.

5. The method of claim 1, wherein the chitosan is present in the aqueous solution of chitosan at a concentration of at least 3.0% and at most 4.0% by mass of the total components of the solution.

6. The method of claim 1, wherein the coating composition comprises 13% to 30% by weight pigment and the pigment is titanium dioxide.

7. The method of claim 1, wherein the coating composition has a pigment volume concentration below 60.

8. The method of claim 1, wherein the coating composition is about 30% to about 60% by weight solids.

9. The method of claim 1, wherein the chitosan has a particle size of less than 30 microns in the coating composition.

10. The method of claim 1, wherein the chitosan has a particle size of less than 20 microns in the coating composition.

11. The method of claim 1, wherein the chitosan has a particle size of less than 16 microns in the coating composition.

12. The method of claim 1, wherein the chitosan is present in the coating composition at a concentration of 0.02 to 1.0 weight percent based on weight of dry coating solids.

13. The method of claim 1, wherein the binder includes an acrylic latex.

14. The method of claim 1, wherein the binder includes a polyurethane dispersion.

15. The method of claim 1, wherein the binder includes a styrene acrylic latex.

16. The method of claim 1, wherein the binder includes a vinyl acrylic latex.

* * * * *